June 16, 1925.
J. BATH
ADJUSTABLE INTERNAL GAUGE
Filed Oct. 20, 1919
1,542,026
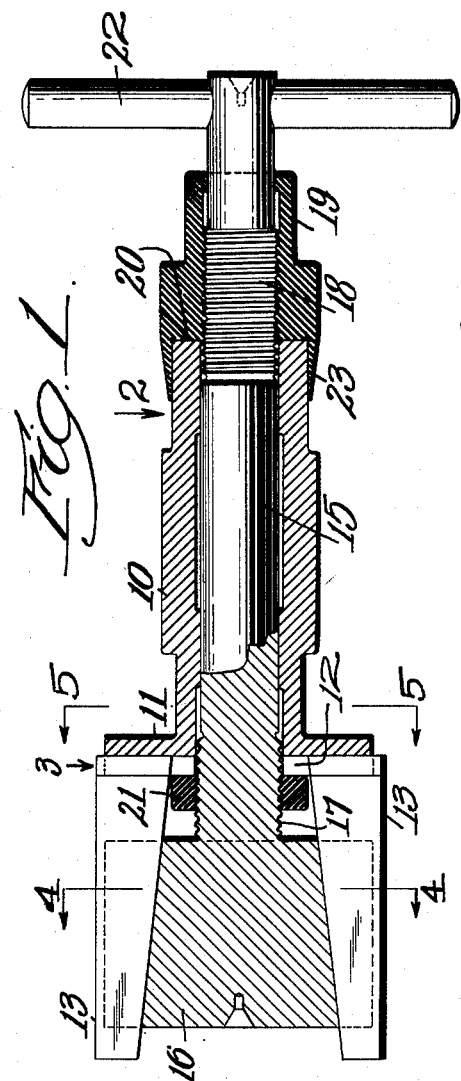
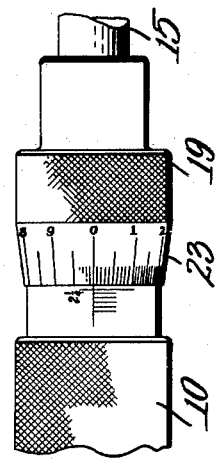
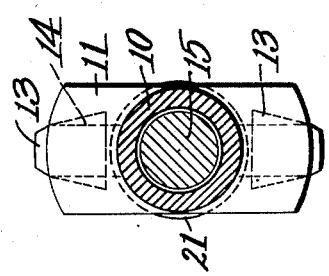
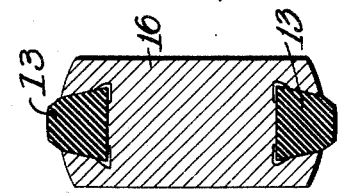
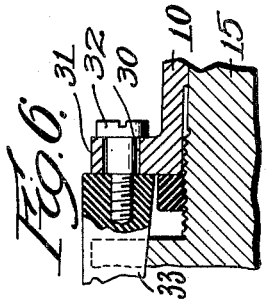

Patented June 16, 1925.

1,542,026

UNITED STATES PATENT OFFICE.

JOHN BATH, OF WORCESTER, MASSACHUSETTS, ASSIGNOR TO JOHN BATH & CO. INC., OF WORCESTER, MASSACHUSETTS, A CORPORATION OF MASSACHUSETTS.

ADJUSTABLE INTERNAL GAUGE.

Application filed October 20, 1919. Serial No. 331,837.

*To all whom it may concern:*

Be it known that I, JOHN BATH, a citizen of the United States, residing at Worcester, in the county of Worcester and State of Massachusetts, have invented a new and useful Adjustable Internal Gauge, of which the following is a specification.

This invention relates to an adjustable gauge for measuring inside diameters. It is the object of my invention to provide an adjustable internal gauge of simple construction, readily adjustable with great accuracy, and adapted to withstand much wear and rough usage.

It is a further object to provide a gauge of this type by which actual as well as comparative sizes may be determined.

My invention further relates to certain arrangements and combination of parts which will be hereinafter described and more particularly pointed out in the appended claims.

A preferred form of my invention is shown in the drawings, in which—

Fig. 1 is a longitudinal sectional elevation of my improved gauge;

Fig. 2 is a partial plan view thereof;

Fig. 3 is a partial plan view of a different portion;

Figs. 4 and 5 are transverse sectional elevations taken along the lines 4—4 and 5—5 in Fig. 1; and Fig. 6 is a detail sectional elevation of a modification.

Referring to the drawings, my improved gauge comprises a sleeve-like body 10 having a flange 11 at one end thereof. The flange 11 is preferably provided with a dovetailed guide way 12 (Fig. 3), in which gauge bars 13 are mounted for radial movement only, the bars 13 each having a dovetailed extension 14 fitting the guide way 12. The bars 13 are also preferably of dovetailed cross section and are tapered toward their outer ends as clearly shown in Fig. 1.

An operating rod 15 is slidable axially in the body 10 and is provided with a head 16 on which are formed additional dove-tailed guide ways within which the bars 13 are seated. The rod 15 is also provided with two threaded portions 17 and 18 extending beyond the ends of the body 10.

A nut 19 is mounted on the outer threaded portion 18 and is provided with a shoulder 20 engaging the outer end of the body 10. A second nut 21 is mounted on the threaded portion 17 and is adapted to engage the opposite end of the body 10. A handle 22 may be provided at the outer end of the rod 15 if desired so that the gauge may be more easily manipulated.

By means of the nuts 19 and 21, the operating rod 15 may be moved axially in either direction to increase or decrease the size of the gauge and may be securely locked in adjusted position. When the nuts 19 and 21 are loosened, the rod 15 may be drawn or pushed freely through the body 10 until the gauge bars 13 engage the walls of the hole or recess to be measured. The nuts 19 and 21 may then be used for final adjustment and for locking the gauge in adjusted position.

The nut 19 is preferably provided with a portion 23 extending over the end of the body 10 and carrying suitable graduations as shown in Fig. 2, these graduations cooperating with linear graduations on the body 10. The combination of these two sets of graduations gives a direct reading by which the diameter of the gauge may be determined with extreme accuracy, after the nuts 19 and 21 have been set up firmly against the opposite ends of the body 10, as each of the small divisions on the sleeve 23, as shown in Fig. 2, represents one ten-thousandth of an inch.

In Fig. 6, I have shown a slightly different method of mounting the gauge bars for radial movement on the end of the body 10. In this form, radial slots 30 are provided in the flange 31 forming the end of the body, and a shouldered stud 32 extends through each slot 30 into the end of the corresponding gauge bar 33. This construction permits radial movement of the gauge bars while preventing axial movement thereof, as in the construction first described.

It will be evident from Fig. 6 that only a limited radial adjustment is provided for, as these gauges are particularly intended for extremely accurate measurements rather than for a wide range in a single gauge.

Having thus described my invention, it will be evident that changes and modifications can be made therein by those skilled in the art within the scope and spirit of my invention as set forth in the claims, and I do not wish to be otherwise limited to the details herein disclosed, but what I claim is:—

1. An adjustable internal gauge comprising an elongated body, a pair of gauge bars mounted on the end of the body for radial movement only thereon and projecting lengthwise from the end of the body, a single operating member engaging both of said bars and effective to move said bars simultaneously radially when moved lengthwise of said body, and means to adjust said operating member lengthwise relatively to said body.

2. An adjustable internal gauge comprising an elongated body, a plurality of gauge bars mounted for radial movement only on said body and beyond which body they project lengthwise thereof, each gauge bar having a surface inclined to the axis of said body, a member slidably mounted in said body and having a plurality of surfaces inclined to the axis of said body and each engaging an inclined surface of one of said gauge bars, and means to move said member lengthwise relatively to said body to adjust said gauge bars radially.

3. An adjustable internal gauge comprising a plurality of gauge bars, an elongated body on one end of which said bars are mounted for radial movement only and beyond which body they project axially of the gauge, a single operating member having simultaneous sliding engagement with all of said bars to move said bars radially, and means to move said member lengthwise relatively to said body to thus adjust said bars radially and to lock said member in adjusted position.

4. An adjustable internal gauge comprising a plurality of gauge bars, an elongated body on one end of which said bars are mounted for radial movement only and beyond which body they project axially of the gauge, a single operating member having simultaneous sliding engagement with all of said bars to move said bars radially, and means to move said member lengthwise relatively to said body, said body and member forming the entire support for said bars.

5. An adjustable internal gauge comprising an elongated body having radial dove-tailed guide-ways at one end thereof, gauge bars mounted for radial movement only in said guide-ways, a member having simultaneous sliding engagement with all of said gauge bars to move said bars radially, and means to move said member lengthwise relatively to said body to thus adjust said gauge bars radially.

6. An adjustable internal gauge having, in combination, a sleeve-like body enlarged at one end, an operating rod slidable in said body and having a head thereon, said body and said head each having dove-tailed guide-ways formed thereon the guide-ways in said body being in said enlarged end thereof, and gauge bars mounted in the guide-ways in said head and movable in the guide-ways in said body, lengthwise movement of said head relative to said body being effective to adjust said gauge bars radially.

7. An adjustable internal gauge having, in combination, a sleeve-like body with a flange at one end, a pair of gauge bars mounted for radial movement only on said flange, an operating rod slidable in said body, and a head secured to said rod and having inclined guide-ways in which said bars are mounted, lengthwise movement of the said rod and head causing corresponding radial movement of said gauge bars.

8. An adjustable internal gauge having, in combination, a sleeve-like body with a flange at one end, a pair of gauge bars mounted for radial movement only on said flange, an operating rod slidable in said body, a head secured to said rod and having inclined guide-ways in which said bars are mounted, and means to move said head lengthwise relatively to said body, lengthwise movement of said head causing corresponding radial movement of said gauge bars.

9. An adjustable internal gauge having, in combination, a sleeve-like body, a pair of gauge bars mounted for radial movement only on one end of said body, a threaded operating rod slidable lengthwise in said body, a head secured thereto and provided with inclined guide-ways in which said bars are mounted, and nuts on said operating rod at both ends of said body effective to move said rod lengthwise relatively to said body, thereby adjusting said gauge bars radially.

10. An adjustable internal gauge comprising a plurality of gauge bars, an elongated body on which said bars are mounted for radial movement only, said body having graduations thereon extending lengthwise thereof, a member having simultaneous sliding engagement with all of said bars to move said bars radially, and means to move said member lengthwise relatively to said body, said means including a graduated nut co-operating with the graduations on said body to indicate the actual diameter of the gauge.

In testimony whereof I have hereunto affixed my signature.

JOHN BATH.